Patented Feb. 14, 1939

2,147,104

UNITED STATES PATENT OFFICE 2,147,104

PROCESS OF MANUFACTURING COLD SWELLING STARCH

Frederik André Möller, Groningen, Netherlands, assignor to Naamlooze Vennootschap: W. A. Scholten's Chemische Fabrieken, Groningen, Netherlands No Drawing. Application October 6, 1936, Serial No. 104,337. In the Netherlands October 7, 1935

4 Claims. (Cl. 127—71)

It is a well known fact that cold swelling starch has the undesired property of forming lumps with water, especially if the product is in a finely powdered form. It has been tried to avoid lump formation by incorporating into the cold swelling starch substances retarding the swelling of the same, such as borax and other weakly alkaline salts, aluminium salts and the like. It has also been proposed to add organic substances, e. g. gelatine or glue, pectinous substances, soluble gums and dextrine.

By the above mentioned prior processes lump formation could be reduced to some extent, but the improvement obtained was not absolutely satisfactory. In practice it has appeared that the cold swelling starches treated in this way still show some lump formation unless the above mentioned substances are added in amounts which are so large that the properties of the cold swelling starch are unfavourably affected.

According to the invention the lump formation of cold swelling starch and other cold swelling or cold soluble starch products on being stirred with water, can be completely avoided without any unfavourable effect on the properties of the starch products by incorporating lecithin into the same.

The lecithin can be of vegetable or animal origin; suitable products are e. g. soja lecithin and egg lecithin. I have found that by incorporating the aforementioned substances into the cold swelling starch products are obtained which immediately produce an absolutely uniform, smooth paste when stirred with water. The lecithin has a very marked influence even when used in relatively small amounts; in many cases, however, it is advantageous to use larger amounts.

A similar favourable action is obtained in the case of other products, which swell or dissolve in cold water, e. g. cold soluble dextrines.

The lecithin can be added in the form of an emulsion, e. g. in water, or of a solution in an organic solvent. It can be incorporated before or during the manufacture of the cold swelling starch; in this case the lecithin is added to the primary materials for the manufacture of the cold swelling starch or to the mixture to be heated before or during the heating process. However, the lecithin can also be incorporated into the ready cold swelling starch. According to an embodiment of the invention the dry cold swelling starch is triturated together with a lecithin product, which has been rendered sufficiently liquid by heating the same. I have found that in this way the lecithin can be distributed in a very uniform way through the cold swelling starch and that a product is obtained which swells in water to a homogeneous paste without a trace of lump formation.

In a similar way other products which swell or dissolve in cold water, can be mixed with the lecithin, and the invention can also be used for mixtures of various starch products.

The products obtained according to the invention are suitable for manufacturing adhesives, in paper manufacture, as a thickening agent in the textile industry and as an addition to baking flours, the baking properties of which are improved by the addition of cold swelling or cold soluble starches containing lecithin.

The invention will be described with reference to the following examples.

Example 1

100 kg. of potato starch are stirred with 150 l. of cold water and 3 kg. of commercial soja lecithin are added. The suspension obtained is converted into cold swelling starch according to methods known per se, e. g. by suddenly heating the suspension and simultaneously pressing the gelatinous paste produced thereby into a thin layer and drying the same.

Example 2

Cold swelling starch, manufactured from a mixture of 50 kg. of potato starch and 50 kg. of maize starch are mixed in dry condition with 5 kg. of commercial soja lecithin which has been rendered sufficiently liquid by heating the same. The mixture is triturated until a uniform product is obtained.

I claim:

1. A process of improving cold swelling and cold soluble starch products comprising incorporating lecithin into the final modified starch product.

2. A process of improving cold swelling and cold soluble starch products comprising incorporating lecithin into the material in any stage of the process of manufacture of the same.

3. A process of improving cold swelling and cold soluble starch products comprising incorporating lecithin into the primary materials for manufacturing the same.

4. A process of improving cold swelling and cold soluble starch products comprising incorporating lecithin into the material by triturating the same with lecithin rendered sufficiently fluid by heating.

FREDERIK ANDRÉ MÖLLER.